United States Patent [19]

Mock et al.

[11] 3,940,744
[45] Feb. 24, 1976

[54] SELF CONTAINED PROGRAM LOADING APPARATUS

[75] Inventors: Howard C. Mock, Rancho Palos Verdes; Kenneth N. Isaac, Tustin; Charles P. Disparte; Warren L. Hall, both of Palos Verdes Peninsula; James Beasely, Sepulveda, all of Calif.

[73] Assignee: Xerox Corporation, Stamford, Conn.

[22] Filed: Dec. 17, 1973

[21] Appl. No.: 425,353

[52] U.S. Cl. .......................................... 340/172.5
[51] Int. Cl.² .................... G06F 11/04; G06F 9/00
[58] Field of Search .................. 444/1; 340/172.5; 235/153 AK

[56] References Cited
UNITED STATES PATENTS

| | | | |
|---|---|---|---|
| 3,343,141 | 9/1967 | Hackl | 340/172.5 |
| 3,518,413 | 6/1970 | Holtey | 235/153 AK |
| 3,634,883 | 1/1972 | Kreidermacher | 340/172.5 |
| 3,675,214 | 7/1972 | Ellis et al. | 340/172.5 |
| 3,696,340 | 10/1972 | Matsushita et al. | 340/172.5 |
| 3,736,563 | 5/1973 | Beckinger et al. | 340/172.5 |
| 3,838,260 | 9/1974 | Nelson | 235/153 AK |

OTHER PUBLICATIONS

Henion et al., Dynamic Corrective Procedure, etc., IBM Technical Disclosure Bulletin, Vol. 16, No. 7, Dec. 1973, pp. 2138-2139.
Wimer, Initiation and Execution Controls, etc., IBM Technical Disclosure Bulletin, Vol. 15, No. 6, Nov. 1972, pp. 1793.

Primary Examiner—Charles E. Atkinson
Attorney, Agent, or Firm—James J. Ralabate; Franklyn C. Weiss; Robert E. Cunha

[57] ABSTRACT

A Read-Only Memory device in the CPU of a microprogrammable computer contains a diagnostic program suitable for self-testing the computer. A microprogram for loading this diagnostic program from the Read-Only Memory device into Main Memory is contained in the Control Memory of the CPU. When required, the diagnostic program is loaded into Main Memory and executed thus allowing for the testing of a computer without the need of operational peripherals.

10 Claims, 2 Drawing Figures

SELF CONTAINED PROGRAM LOADING APPARATUS

BACKGROUND OF THE INVENTION

This invention relates to data processing equipment and more particularly to circuits for storing a diagnostic program on a Read-Only Memory device within the central processing unit (CPU). Upon an appropriate setting of control panel switches, this diagnostic program may be transferred to Main Memory and executed.

In a data processng installation containing a microprogrammable CPU, there are three kinds of diagnostic programs that may be used. One is the micro-coded diagnostic program contained in the Control Memory of the CPU. At predetermined timed intervals or upon the occurrence of predetermined events and switch positions, the CPU will execute its internal micro-coded diagnostic program. This micro program may either be brief or extensive and may test the data processing capability of either the CPU or the entire data processing system. One shortcoming of this kind of micro-coded diagnostic program is that it does not test the ability of the system to execute a program contained in Main Memory.

The second, and most common, form of diagnostic program is written into Main Memory, may be implemented to test any part of the data processing system or the entire system, may be on-line or off-line, and may be instituted on the occurrence of any predetermined set of conditions. The problem with this form of diagnostic program is that it must be loaded from a peripheral device and therefore the existence of this program in memory is dependent upon the proper operation of the CPU, the Main Memory, at least one controller and at least one peripheral device.

A third form of diagnostic program is one that is written into Main Memory in permanent form. In a core memory, for instance, that portion of memory containing the diagnostic program may be wired such that the contents of memory cannot be changed. A diagnostic program implemented in this fashion would not be dependent upon an operable peripheral device and controller, and would test the CPU's ability to execute a program contained in Main Memory. However, the portion of memory used in this manner becomes dedicated to the diagnostic program and can not be erased and used for application programs upon the successful completion of the diagnostic test. Furthermore, since the program is not modifiable the program's testing ability is not as powerful as it could otherwise have been since the program must perform without the benefit of self-modifying instruction sets which increase the power and flexibility of the program.

Thus, it can be seen that in the prior art there is no capability for testing of a stand-alone computer by means of an erasable diagnostic program located in Main Memory.

SUMMARY OF THE INVENTION

This application discloses a data processing system comprising a Main Memory and a microprogrammable CPU. In the described embodiment the Main Memory is organized to store sixteen bit words.

The CPU is controlled by a several thousand word control microprogram. Each word is 60 bits in length and the entire microprogram is stored on Read-Only Memory (ROM) chips in the Control Memory.

Separate ROM's contained within the CPU store a 16 bit software diagnostic program coded in machine language that can be loaded into and executed from Main Memory. When a control panel switch is in the "Diagnostic" position, a micro-coded subroutine in the Control Memory for loading this diagnostic program from the ROM's into Main Memory will be executed, and control of the CPU will then be passed to that diagnostic program just loaded. The diagnostic program will test the computer, isolate any faults and report the results to an appropriate fault register, the output of which may be viewed at the control panel. Provision is also made for stepping through the diagnostic program so that the particular instruction generating the fault may be isolated.

With this implementation it may be seen that all the disadvantages incorporated within the prior art diagnostic systems have been overcome. Since the diagnostic program is a standard software diagnostic it can test the ability of the CPU to execute Main Memory programs. As such it is very useful in conjunction with a micro-coded diagnostic program in that the micro-coded diagnostic may be run first to test the proper operation of the CPU and then the software diagnostic program may be run to test the proper operation of Main Memory programs.

Since the diagnostic program is loaded from the CPU and not from a peripheral device, a stand-alone computer may be tested without the necessity of an operable peripheral device and controller. Finally, since the diagnostic program is a standard software program it is fully self-modifiable, it may be transferred to any part of Main Memory, and it is erasable upon completion of its testing so that the entire Main Memory may be used for application programs.

It is therefore the object of this invention to provide a capability for the testing of a stand-alone computer by means of an erasable diagnostic program located in Main Memory.

DETAILED DESCRIPTION OF THE INVENTION

Figure 1:
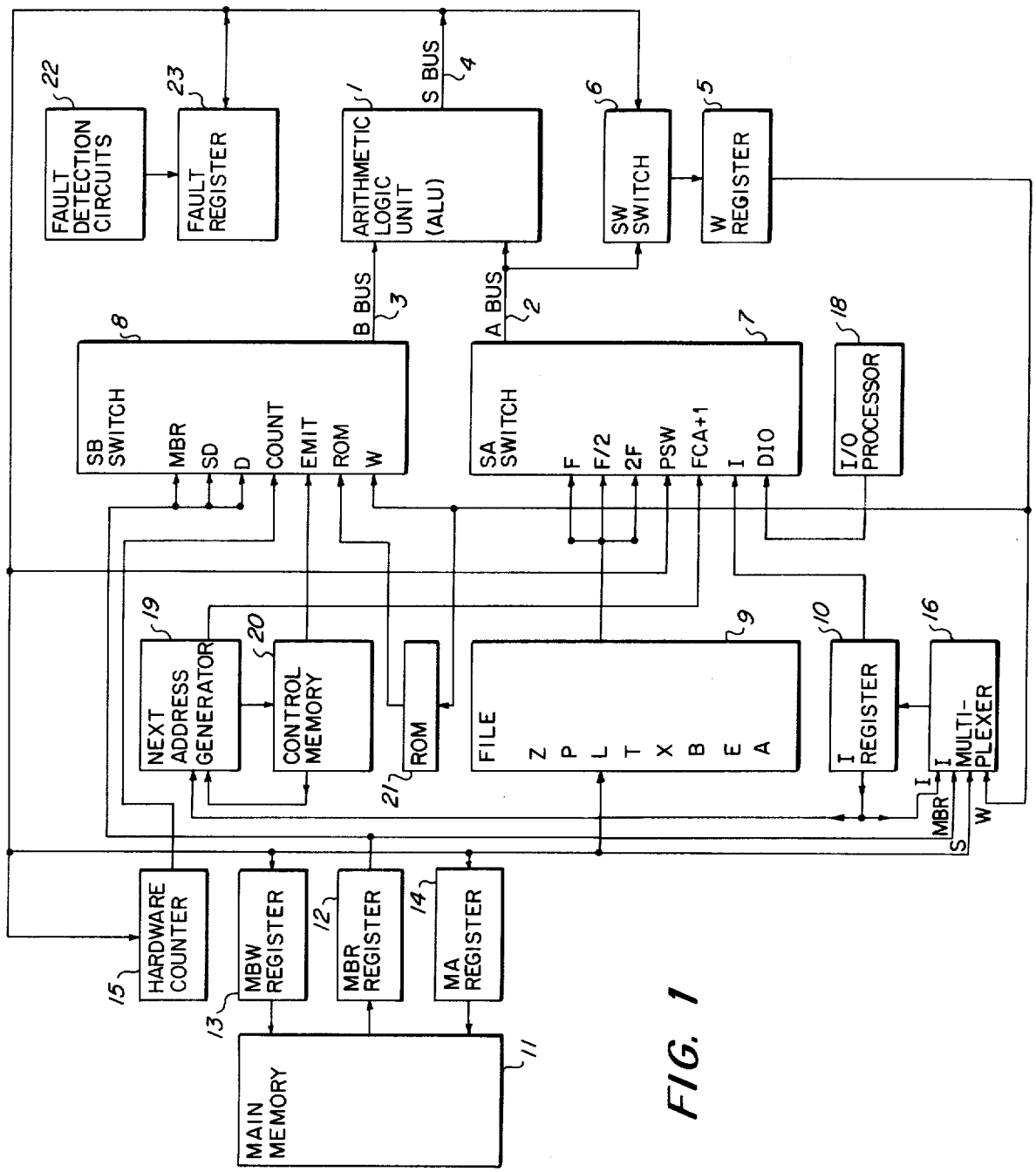
FIG. 1 is a block diagram of a computer in which this invention may be utilized.

In the preferred embodiment the hardware necessary to implement this internal software diagnostic capability is shown in block diagram form in FIG. 1 and may be described generally as a data processing system with a CPU controlled by a microprogrammed Control Memory. Operation codes in machine language contained in Main Memory are used to call on the various microprograms contained in the Control Memory which implement the specified operations.

The CPU in FIG. 1 is implemented to provide parallel handling of 16 bit words and is built around an Arithmetic Logic Unit (ALU) 1 which performs all the required arithmetic or logic functions. The two input functions are the A Bus 2 and the B Bus 3 and the output is distributed throughout the CPU on the S Bus 4. The SW Switch 6 controls the loading of the W Register from the S Bus 4 or the SA Switch 7.

The SA Switch 7 is a multiplexer that determines what function is to be placed on the sixteen bit A Bus 2. The relevant input functions are defined as follows: F is the output of the File 9. F/2 is the File output shifted one place to the right. This is used in conjunction with the hardware multiply. 2F is the output of the File shifted one place to the left. This is used in conjunction with the hardware divide. PSW is the program status word which contains the over flow and carry indicators as well as bits pertaining to other CPU status functions. I is the output of the I Register 10. The DIO input is received on a set of data lines from an Input/Output Processor 18. The FCA+1 input is the address of the current microprogram instruction address +1. This is generally used for "branch and save" micro subroutine calls wherein the return address is stored in the File 9 or I Register 10.

The SB Switch 8 is another multiplexer which determines what function is to be placed on the sixteen bit B Bus 2 which is the other input to the ALU 1. MBR is the data input from the MBR Register 12. SD is the lower byte of the MBR data with the sign of the byte (bit 8) spread through the upper byte. This is used for effective operand address calculation. D is the lower byte of the MBR data with 0's in the upper byte. This is also used for effective operand address calculations. The ROM input is the output of the addressable ROM's contaning the diagnostic program. The programmable ROM's are addressed by the eight least significant bits of the W Register. The W input is data from the W Register 5. The EMIT input receives 16 bits of EMIT data from the Control Memory 20 output. This emit data will be explained below. COUNT is the output of an eight bit Hardware Counter 15 contained within the CPU and is used for various counting operations by the Control Memory microprograms.

The File 9 may be implemented from any random access memory device and has a capability of 32,16 bit words. The first eight words have specific functions. Z is a zero source. P is the address of the current instruction in the Main Memory program. L is the link address and is used to store the return address during the execution of a Main Memory program subroutine. T is a temporary storage location. X is index register number 1 and is used by the hardware for post-indexing. D is index register number 2 and is used by the hardware for preindexing. A is the Accumulator and E is the Extension of the Accumulator. The remaining 24 locations in the File may be used by the microprogrammer as working File locations and are referred to as File Eight through 31. The MBW Register 13 holds data that will be written into Main Memory 11 while the MBR Register 12 holds data that has been read from Main Memory. The MA Register 14 holds the address of that location in Main Memory that is currently being read from or written into.

The microprogram for control of the CPU is contained in the Control Memory 20. In the described embodiment, this microprogram comprises about 2000 words, each 60 bits long. As each word in Control Memory is accessed, the 60 bits of information are fed out through control lines, not shown, to control all elements of the CPU. Sixteen of these control lines go to the Next Address Generator 19. The Next Address Generator determines the address of the next microprogram instruction to be accessed based not only on the 16 lines of address information from the Control Memory but also on the status of various registers and indicators throughout the system. In this fashion, the microprogram in Control Memory proceeds from one instruction to the next.

In the case where instructions are being executed in numerical sequence in the Control Memory, the 16 bits of next address information are not used for addressing and can be used for another purpose. These sixteen address lines are permanently wired to the EMIT input of the SB Switch. At the election of the microprogrammer, the next sequential address can be specified and the EMIT field may be selected through the SB Switch and applied as one of the two inputs to the ALU. In this case the 16 bits from Control Memory which normally represent an address are used as a sixteen bit data word. This is known as a "literal" in normal software programming. This technique presents an increased efficiency in the use of the Control Memory since in the EMIT mode, data is supplied directly from the Control Memory instead of data being supplied from a location the address of which is supplied by Control Memory.

Figure 2:
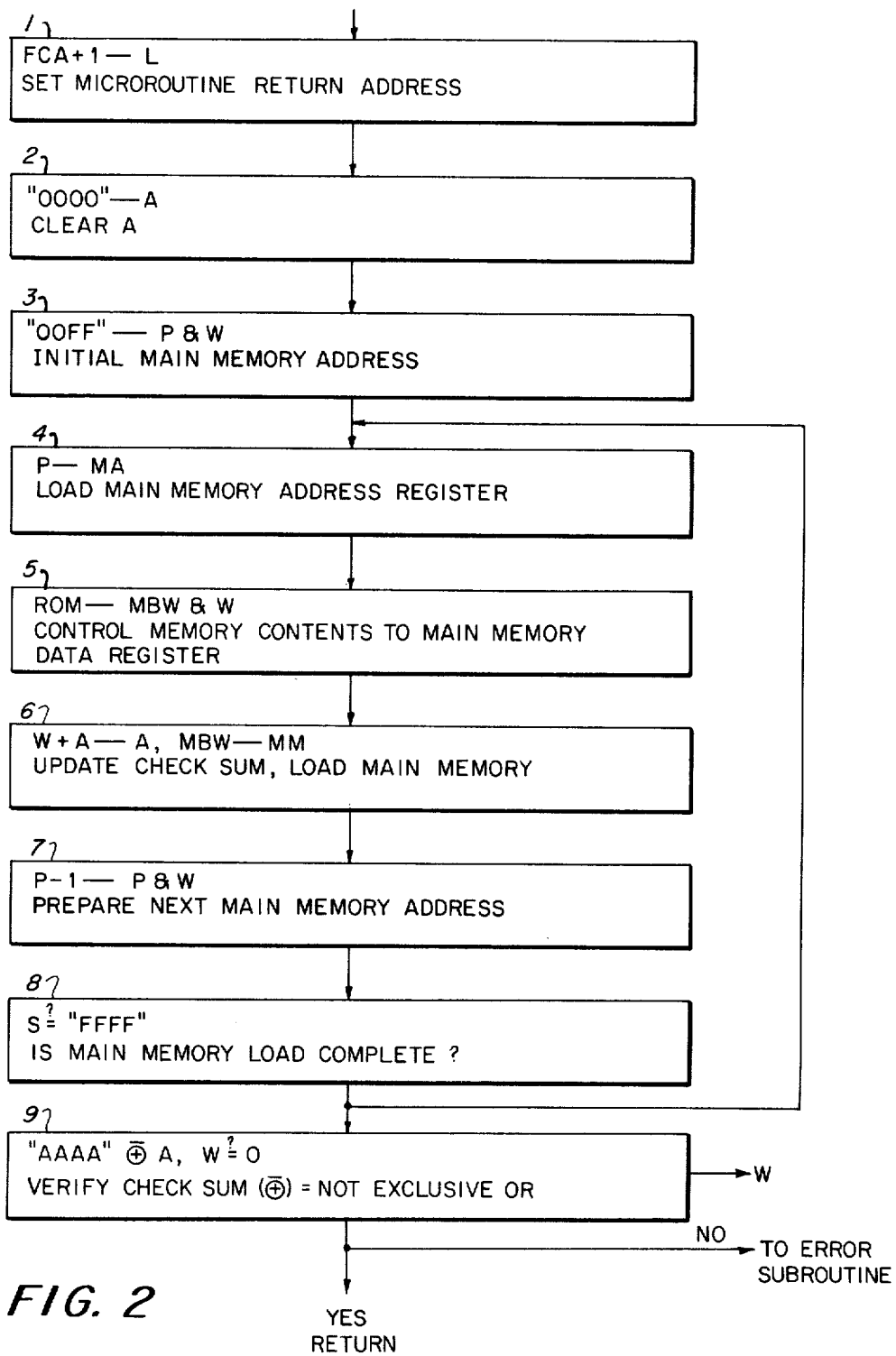
FIG. 2 is a flow chart of a micro-coded loader program contained in the control memory.

FIG. 2 is a flow chart of the micro-coded subroutine in Control Memory that is used to load the diagnostic program from the ROM into Main Memory. The micro-coded subroutine is entered at Location 1 where the return address is stored in the Link Register of the File 9. The Next Address Generator 19 in FIG. 1 automatically adds 1 to the address of the current microprogram instruction and supplies it to the SA Switch 7. The control lines emanating from Control Memory 20 select the FCA +1 output from the SA Switch onto the A Bus 2, select the appropriate ALU function such that the output equals the A Bus input, and finally controls the File 9 so that the S Bus data is clocked into the L Register. The result of these operations is that the return address for this subroutine is transferred from the Next Address Generator 19 through the SA Switch, through the ALU, and then to the L Register in one instruction cycle.

At location 2 of FIG. 2, 16 zero bits from the Zero Register of File 9 are clocked through the SA Switch and through the ALU to the Accumulator in File 9. The Accumulator in this subroutine is used as a check sum and therefore the instruction in Location 2 zeros the check sum prior to loading of the diagnostic program into Main Memory.

At location 3, a hexadecimal "OOFF" is produced by the EMIT field and is loaded into the P and W Registers. Since this subroutine is executing instructions from sequential words in memory, the next address field of the current instruction is not being used for addressing purposes and is therefore programmed with an "OOFF," 255 in decimal notation, and is used as the EMIT input to the SB Switch 8. The 256 word diagnostic program is stored in locations 0-255 in the ROM and will be loaded into locations 0-255 in Main Memory. Since W is used to address the ROM, and P is used eventually as the address of the location to be loaded in Main Memory, the effect of the execution of the instruction in Location 3 is to set up both addresses. At this point, P and W now contain the address of the last word of the diagnostic program.

In location 4 the contents of the P Register which is a Main Memory address, is loaded into the MA Register, and in location 5 the contents of the ROM, which is a diagnostic program instruction, is loaded into the MBW Register 13 and the W Register 5.

In Location 6, the last diagnostic program instruction is loaded into the Main Memory from the MBW Register 13, into the location specified by the contents of the MA Register 14. During the same instruction cycle, the contents of W which is the instruction just loaded into Main Memory, is added to the content of the Accumulator which is the previous check sum, resulting in an updated check sum.

At Location 7, the contents of the P Register, which is the address of the word just loaded, is decremented by 1 to produce the address of the next diagnostic program word to be loaded and that address is loaded into the P and W Registers.

At Location 8, the S Bus which contains the memory address just computed is tested for all 1's ("FFFF"). The first time through the subroutine the number will become "OOFE" or 254 in decimal notation. Therefore, the program will branch back to location 4 to enable the next load operation. The subroutine will continue to loop until the last word has been loaded from the ROM into Main Memory. At that point, location eight will contain a minus 1, "FFFF" in hexidecimal notation. At this point the subroutine will proceed to location 9 where the final check sum is compared through the use of an exclusive OR function with the EMIT field data, "AAAA," which represents the correct check sum. If an error is detected the subroutine branches to an error subroutine; otherwise control of the computer passes back to the calling microprogram which will initiate a transfer of control to the diagnostic program just loaded into Main Memory.

The use of an additional memory for storing a diagnostic program is discussed in the preceding discussion of the preferred embodiment, but the additional memory could be used equally well for other purposes. For example, individual users may need a self contained loading apparatus for storing into memory, loader subroutines, system turn-on and initialization subroutines, system generation programs, or any short program which the individual user may need to load into main memory and execute prior to loading full programs through the normal I/O channels. This apparatus could also be used to load a reduced capability application program into a stand-alone computer which would then be operable on a limited basis, without requiring the availability of peripheral devices.

It is to be understood that the above described arrangement is merely illustrative of the principles of the invention. For instance, this invention may be used in a variety of computers, and its use need not be restricted to computers with the specific architecture shown. Similarly, other micro-coded programs for accomplishing the loading and execution of a diagnostic program may be equivalent to the one shown and described herein.

While particular embodiments of the present invention have been described and illustrated it will be apparent to those skilled in the art that changes and modifications may be made therein without departure from the spirit and scope of the invention as claimed.

What is claimed is:

1. In a computer having a main memory for storing programs, apparatus comprising:
   additional memory for permanently storing a program, and
   a central processing unit for transferring said program from said additional memory to said main memory and for executing programs in main memory.

2. The apparatus of claim 1 wherein said additional memory is implemented from read-only memory devices.

3. The apparatus of claim 2 wherein said central processing unit further comprises:
   a control memory containing a microprogram which specifies all steps for the performance of said transferring of programs, and
   circuits responsive to the execution of said control memory microprogram for performing said steps.

4. In a computer having a main memory for storing programs, apparatus comprising:
   additional read-only memory for storing a program,
   circuit means for copying said program from said additional memory into said main memory, and
   a microprogrammable control memory means responsive to the execution of a micro-coded program contained within said control memory means for controlling said circuit means in the copying of said program from said additional memory to said main memory.

5. In a computer having a control memory for controlling the central processing unit of said computer and a main memory for storing programs, apparatus comprising:
   additional memory for permanently storing a program, and
   circuits contained within said central processing unit and responsive to the execution of control memory programs for copying the program from said additional memory into said memory and for executing said program.

6. In a computer having a main memory for storing programs, diagnostic apparatus comprising:
   additional memory for permanently storing a program,
   a diagnostic program stored within said additional memory, and
   a central processing unit for transferring said diagnostic program from said additional memory to said main memory and for executing programs in main memory.

7. The apparatus of claim 6 wherein said additional memory is implemented from read-only memory devices.

8. The apparatus of claim 7 wherein said central processing unit further comprises:
   a control memory containing a microprogram which specifies all steps for the performance of said transferring of programs, and
   circuits responsive to the execution of said control memory microprogram for performing said steps 9. In a computer having a main memory for storing programs, diagnostic apparatus comprising:
   additional read-only memory for storing a program,
   a diagnostic program stored within said additional memory,
   circuit means for copying said diagnostic program from said additional memory into said main memory, and,
   a microprogrammable control memory means responsive to the execution of a micro-coded program contained within said control memory means for controlling said circuit means in the copying of said diagnostic program from said additional memory to said main memory.

10. In a computer having a control memory for controlling the central processing unit of said computer and a main memory for storing programs, diagnostic apparatus comprising:
   additional memory for permanently storing a program,
   a diagnostic program stored within said additional memory, and
circuits contained within said control processing unit and responsive to the execution of control memory programs for copying the program from said additional memory into said main memory and for executing said program.

* * * * *